United States Patent Office 3,525,217
Patented Aug. 25, 1970

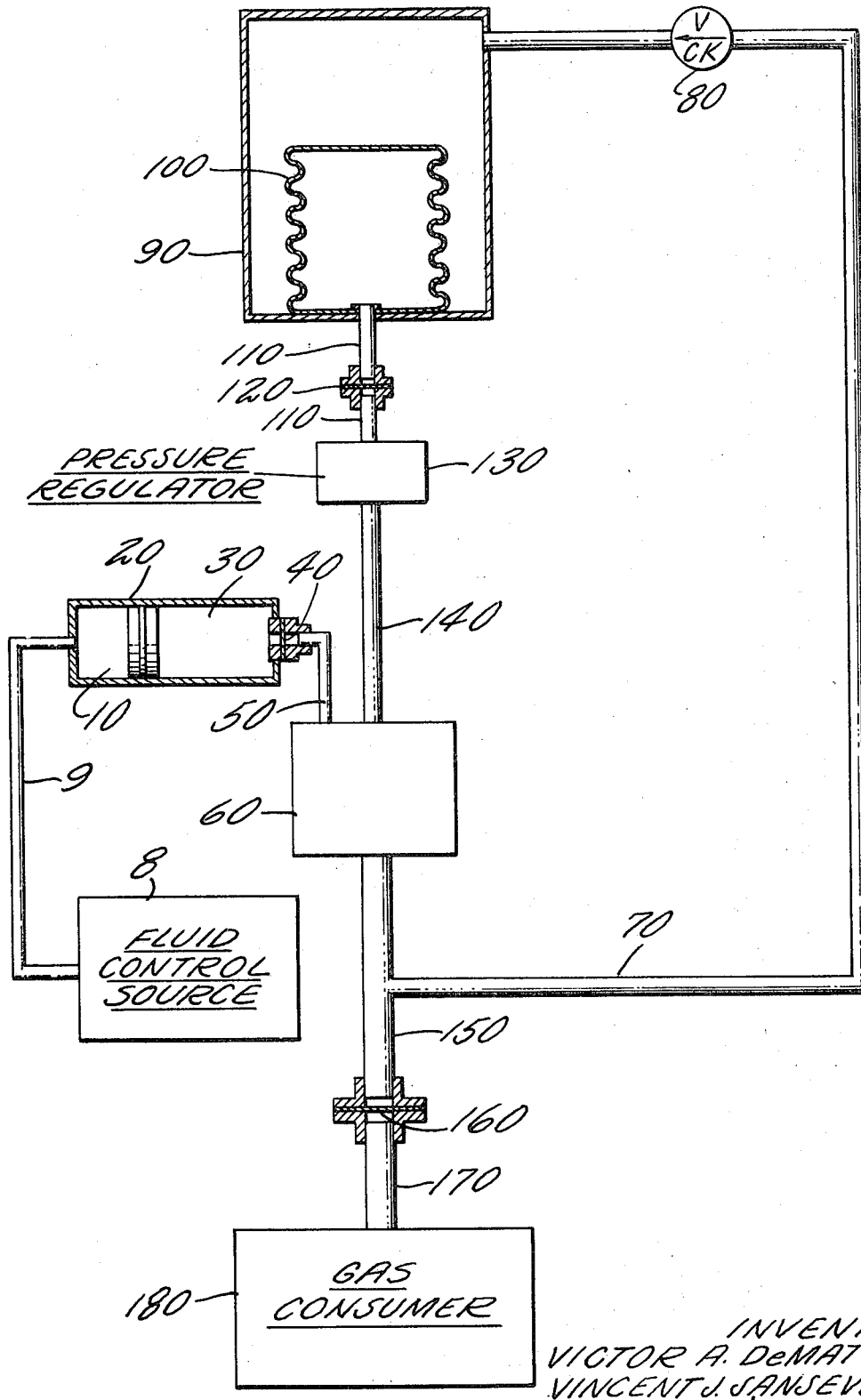

3,525,217
SELF-PRESSURIZED GAS GENERATION SYSTEM
Victor A. De Mattia, Jr., East Longmeadow, Mass., and Vincent J. Sansevero, Jr., East Hartford, Conn., assignors to United Aircraft Corporation, East Hartford, Conn., a corporation of Delaware
Filed Apr. 29, 1968, Ser. No. 725,049
Int. Cl. F01k 25/08
U.S. Cl. 60—37                         2 Claims

ABSTRACT OF THE DISCLOSURE

A gas generating system having means for ejecting a secondary source of monopropellant such as liquid hydrazine by means of a piston in a cylinder, an elastic diaphragm or a bellows. Ejected monopropellant ruptures a frangible disc, flows into a catalyst chamber, produces a high pressure gas which is directed through a check valve to the main propellant tank and by pressurization of the tank expels the primary propellant to rupture a second frangible disc. This primary propellant flows into the catalyst chamber resulting in further catalytic decomposition of propellant causing an increased pressure level which ruptures a third frangible disc allowing external flow of generated gas.

BACKGROUND OF THE INVENTION

Field of invention

This invention relates to gas generation system and more particularly to those using a monopropellant fuel.

Description of the prior art

In the fluids art, a variety of gas generating systems are known. A common form requires storage of high pressure gas for extended periods of time. This is undesirable because sealing problems are created particularly where the gas generating system is being used by a space vehicle during flight or in other applications particularly where remote actuation by small energy devices after long storage times is required. Mechanical springs have also been used to inject propellant into a catalyst chamber, but this keeps pressure on the fuel at all times which also causes sealing problems. Additional weight for the assembly is required in each of the foregoing designs because the structure must frequently be designed to contain sustained high forces under varying environmental conditions.

SUMMARY OF INVENTION

A primary object of the present invention is to provide an improved gas generation system that will store the energy to initiate and continue the gas generating process by chemical means without high pressure seals or springs. By eliminating springs the total volume of the apparatus can be reduced.

Another object of the invention is to provide a gas generating system which can be initiated by a minimum energy level signal.

Another object of the invention is to encapsulate the liquid monopropellant in metal containers without the necessity for use of elastomeric or other nonmetallic sealing devices for extended periods of time.

Still another object of the invention is to provide a gas generating system of maximum simplicity.

In accordance with the present invention, chemical means are used for initiating a monopropellant gas generating system. More particularly a main pressurizable source of fuel is pressurized from gases generated in catalytic reaction of a secondary source of fuel; the secondary source of fuel is selectively pressurized upon demand to cause the secondary source of fuel to pass into the catalyst chamber to initiate the reaction in response to the establishment of a sufficient pressure to operate a pressure responsive flow restriction.

In accordance with further aspects of the present invention, the flow of main fuel is prevented until sufficient pressure is built up therein so as to operate an additional pressure responsive flow restriction. Further, flow of gaseous product from the catalytic chamber may be controlled by a frangible diaphragm (whereby flow is allowed after the initial reaction builds up substantial pressure) or may be selective (which may include hand operated valve means).

In accordance with the further aspects of this invention the flow propellant may be regulated by a pressure regulator and then directed to the catalyst chamber to generate the main gaseous product. The output pressure will not vary as a function of the fuel pressure.

Other features and advantages will be apparent from the specification and claims and from the accompanying drawing which illustrates an embodiment of the invention.

BRIEF DESCRIPTION OF THE DRAWING

The sole figure herein is a diagrammatic representation of a gas generating system in accordance with the present invention.

DESCRIPTION OF THE PREFERRED EMBODIMENT

Referring to the figure, a fluid signal from fluid control source 8 flows through tube 9 into a cylinder 10, provided with a piston 20, to discharge a liquid propellant from a chamber 30. A frangible disc 40 is ruptured by the flow of a propellant which passes via a supply tube 50 into a catalyst chamber 60. The catalyst chamber may be of any form including a cylindrical housing adapted to hold the catalyst screens for rapid decomposition of the propellant.

Catalytic decomposition of the propellant immediately causes a pressure rise within the catalyst chamber. The pressure of the gaseous products pass from a feedback line 70, to a check valve 80 to a reservoir 90. The check valve 80 prevents gas from leaving the reservoir 90.

Pressure in the reservoir 90 causes compression of a bellows 100 resulting in expulsion of propellant located within the bellows 100. The propellant then flows through a supply tube 110 and ruptures a frangible disc 120. A pressure regulator 130 by controlling to a predetermined pressure controls the flow of propellant through the ruptured frangible disc 120 and a tube 140 into the catalytic chamber 60. This results in further catalytic decomposition within the catalytic chamber 60. The pressures in the feedback tube 70, the reservoir 90 and a tube 150 will increase to a maximum value. The maximum value is determined by a frangible disc 160 which will rupture causing a decline in the tube 150 pressure because of the flow through an outlet tube 170 to a utilization device. The check valve 80 will prevent reverse flow of gaseous product out of the reservoir 90. A slowly decreasing expulsive force is maintained on the propellant located in the bellows 100 because of the trapping of gas in the reservoir 90.

The pressure of the flow in the outlet tube 170 will be a function of the regulated pressure at the outlet of pressure regulator 130. The gas at the outlet tube 170 may be utilized for a power system, propulsion, or other energy consuming device.

Various monopropellants may be used such as hydrazine, $N_2H_4$ or hydrogen peroxide. Various catalysts may be used such as one formed of iron, nickel, and cobalt deposited on aluminum oxide pellets. The fluid pressure utilized to force piston 20 against the propellant located in chamber 30 may be an inert gas such as nitrogen or helium.

The fluid signal that initiates the reaction may be from a pressurized container which may be equipped with a manually operated or solenoid valve. The intent is to utilize a low pressure fluid which will act on a relatively large area to expel the secondary fuel. Still another alternate would be to use a mechanical linkage to directly or by means of a fluid bellows urge the piston against the fluid. A solenoid could also be used. In small systems it would even be possible to have a rod connected to the piston which could be manually moved without apparatus to increase the mechanical advantage. Other pneumatic, hydraulic, mechanical, or electrical drive means are obvious to those skilled in the art.

Alternatively to the piston and cylinder an elastic diaphragm, bellows or closed pressurizable tank with the fuel surface below the outlet tube may be utilized. Similarly the primary source of fuel may be ejected by these same types of apparatus instead of the preferred bellows arrangement.

The objects of the invention have been accomplished because: (a) The propellant in the chamber 30 and the bellows 100 is at a pressure equal or lower than ambient; (b) The assembly does not contain any springs; (c) Operation of the system can be initiated by a low pressure level fluid signal since the piston 20 can be enlarged as required to meet the requirements; (d) Encapsulation of the monopropellant without elastomeric seals is achieved in the system by the use of frangible discs 40 and 120 to prevent flow from the chamber 30 and the bellows 100; and (e) Maximum simplicity is attained by elimination of springs and elastomeric seals and utilization of frangible discs instead of valves.

Having thus described a preferred embodiment of our invention, what we claim as new and desire to secure by Letters Patent of the United States is:

1. A monopropellant gas generating system having a catalyst chamber for converting the monopropellant from its liquid to its gaseous state so as to develop energy to an output load,
   means for regulating said energy as a function of the output load,
   said means including
      a closed chamber having an inlet,
      a variable volume reservoir disposed in said closed chamber encapsulating said monopropellant when in its liquid state,
      a feed line communicating said catalyst chamber with said inlet for admitting pressurized gaseous monopropellant into said closed chamber to surround said variable volume chamber and force liquid monopropellant therefrom,
      a check valve in said feed line to prevent gaseous monopropellant in said closed chamber from escaping therefrom,
      first connection means interconnecting said variable volume reservoir and said catalyst chamber,
      a pressure regulator disposed in said connection means for maintaining pressure therein at a predetermined value,
      second fluid connection means interconnecting said catalyst chamber and said output load,
   frangible means disposed on said second fluid connection means closing communication between said catalyst chamber and said output load until the pressure of the gaseous monopropellant discharging therefrom reaches a predetermined value which value is sufficient to load said variable volume reservoir to expel said liquid monopropellant, and
   means independent of said variable volume reservoir for supplying sufficient fuel to said catalytic chamber so as to generate sufficient gas to sequentially charge said closed chamber and burst said frangible member.

2. A monopropellant gas generating system as claimed in claim 1 wherein said means for supplying sufficient fuel to said catalytic chamber includes a housing having one end communicating with said catalytic chamber, a piston in said housing defining a pair of chambers, one of said chambers having monopropellant fuel adapted to communicate with said catalytic chamber and the other chamber for receiving a medium for urging monopropellant fuel into said catalytic chamber.

References Cited

UNITED STATES PATENTS

| 2,402,826 | 6/1946 | Lubbock | 60—39.48 |
| 2,858,672 | 11/1958 | Clark | 60—39.48 |
| 2,959,004 | 11/1960 | Greiner | 60—39.48 |

SAMUEL FEINBERG, Primary Examiner

U.S. Cl. X.R.

60—200, 39.46, 39.48